United States Patent
Homer et al.

(10) Patent No.: US 10,342,093 B2
(45) Date of Patent: Jul. 2, 2019

(54) DISPLAY DEVICE AND METHOD FOR ILLUMINATING AN EDGE AREA THEREOF

(71) Applicant: NOVOMATIC AG, Gumpoldskirchen (AT)

(72) Inventors: Alois Homer, Gumpoldskirchen (AT); Marek Gawel, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 53 days.

(21) Appl. No.: 15/592,054

(22) Filed: May 10, 2017

(65) Prior Publication Data
US 2017/0301284 A1   Oct. 19, 2017

Related U.S. Application Data

(63) Continuation of application No. PCT/EP2015/076342, filed on Nov. 11, 2015.

(51) Int. Cl.
*G09G 3/34* (2006.01)
*H05B 33/08* (2006.01)
(Continued)

(52) U.S. Cl.
CPC ......... *H05B 33/0872* (2013.01); *A63F 13/25* (2014.09); *F21K 9/61* (2016.08); *F21K 9/69* (2016.08); *F21V 33/0052* (2013.01); *G01J 3/0218* (2013.01); *G01J 3/506* (2013.01); *G06F 1/1601* (2013.01); *G06F 3/1446* (2013.01); *G07F 17/3211* (2013.01); *G07F 17/3216* (2013.01); *G09G 3/32* (2013.01); *G09G 3/3413* (2013.01); *G09G 5/006* (2013.01); *H04N 9/74* (2013.01); *H05B 33/0869* (2013.01); *F21Y 2103/10* (2016.08); *F21Y 2115/10* (2016.08); *G09F 9/3026* (2013.01); *G09G 3/02* (2013.01); *G09G 2300/026* (2013.01); *G09G 2310/0232* (2013.01); *G09G 2320/0646* (2013.01); *G09G 2320/0666* (2013.01); *G09G 2352/00* (2013.01);
(Continued)

(58) Field of Classification Search
CPC ....... H05B 33/0872; A63F 13/25; F21K 9/61; F21K 9/69
USPC .......................................................... 345/82
See application file for complete search history.

(56) References Cited

U.S. PATENT DOCUMENTS

2006/0077544 A1*  4/2006  Stark .................. G02F 1/13336
                                                            359/448
2009/0096965 A1*  4/2009  Nagata .............. G02F 1/133305
                                                            349/103
(Continued)

FOREIGN PATENT DOCUMENTS

CN          102339565 A       1/2012
DE    102007004834 A1        8/2008
(Continued)

OTHER PUBLICATIONS

International Search Report received in correspondence application PCT/EP2015/076342, dated May 3, 2016.

*Primary Examiner* — Jonathan M Blancha
(74) *Attorney, Agent, or Firm* — EIP US LLP (57) ABSTRACT

The present disclosure relates to a display device comprising at least two display units as well as an illuminating device for illuminating a transition area between the at least two display units. The disclosure further relates to a method of operating such a display device as well as an entertainment machine comprising such a display device.

22 Claims, 7 Drawing Sheets

(51) Int. Cl.

| | |
|---|---|
| *G06F 3/14* | (2006.01) |
| *G06F 1/16* | (2006.01) |
| *G07F 17/32* | (2006.01) |
| *H04N 9/74* | (2006.01) |
| *G09G 3/32* | (2016.01) |
| *G09G 5/00* | (2006.01) |
| *A63F 13/25* | (2014.01) |
| *F21K 9/61* | (2016.01) |
| *F21K 9/69* | (2016.01) |
| *F21V 33/00* | (2006.01) |
| *G01J 3/02* | (2006.01) |
| *G01J 3/50* | (2006.01) |
| *G09F 9/302* | (2006.01) |
| *G09G 3/02* | (2006.01) |
| *F21Y 103/10* | (2016.01) |
| *F21Y 115/10* | (2016.01) |

(52) U.S. Cl.
CPC . *G09G 2360/144* (2013.01); *G09G 2360/145* (2013.01); *G09G 2360/16* (2013.01); *Y02B 20/341* (2013.01)

(56) References Cited

U.S. PATENT DOCUMENTS

| | | |
|---|---|---|
| 2010/0213877 A1 | 8/2010 | Galeazzi |
| 2013/0176352 A1* | 7/2013 | Watanabe ............... G09G 3/34 345/690 |
| 2015/0362657 A1* | 12/2015 | Wang ................... G02B 6/0045 345/690 |
| 2017/0206831 A1* | 7/2017 | Schmittat ............... B60R 13/02 |

FOREIGN PATENT DOCUMENTS

| | | |
|---|---|---|
| EP | 1379082 B1 | 1/2004 |
| EP | 1994801 A1 | 9/2007 |
| FR | 2982989 B1 | 5/2013 |
| GB | 2274225 A | 7/1994 |
| WO | 2007113754 A1 | 10/2007 |
| WO | 2008142639 A1 | 11/2008 |
| WO | 2009033615 A1 | 3/2009 |
| WO | 2016074795 A2 | 5/2016 |

* cited by examiner

DISPLAY DEVICE AND METHOD FOR ILLUMINATING AN EDGE AREA THEREOF

CROSS-REFERENCE TO RELATED APPLICATIONS

This application is a continuation under 35 U.S.C. § 120 of PCT Application No. PCT/EP2015/076342, filed Nov. 11, 2015, which claims priority to German Application No. 10 2014 016 643.0, filed Nov. 11, 2014. The entire contents of each of the aforementioned applications are hereby incorporated by reference.

TECHNICAL FIELD

The present invention relates to a display device comprising at least two display units as well as an illuminating device for illuminating a transition area between the at least two display units. The invention further relates to a method for operating such a display device as well as an entertainment machine comprising such a display device.

BACKGROUND ART

In the case of entertainment machines, such as, for example, gaming devices, gambling terminals and other entertainment devices or also in the case of large-surface display devices, such as public viewing displays or conference room displays, it is sometimes advantageous, to use a plurality of separately embodied display units, which are arranged next to one another or on top of one another, instead of using a single, large-area display unit. By means of display units, which on principle have standard formats, it is also possible through this to create display devices of other formats, without having to use expensive custom products for this purpose. On the other hand, a plurality of separate, independently operable display units can also be advantageous, for example in the case of entertainment machines, so as to be able to display different image contents without extensive split screen control of an individual screen, for example so as to be able to present a game content on one display unit and additional information, such as stakes, rules and the like or also a second game content— for example an additional game—on another display unit. The display units themselves can hereby in each case form assemblies, which are independent per se, which form display assemblies, which can be mounted or exchanged independently from one another, respectively, and/or which have power supply units, which are embodied independently from one another, and/or control systems, which are embodied independently from one another, which control the display elements, which are generated on the respective display unit. In the context of the application at hand, a display unit can in particular be a screen, wherein a screen, which forms a display unit, can be embodied so as to be flat in terms of a common flat screen or curved in terms of an electronic screen, which simulates reels, for example.

In the context of the invention at hand, separate display units are thus in particular independently functioning display assemblies, which have display surfaces, which are visible or perceivable, respectively, independently from one another and which in each case have an independent spatially-physically defined shape, which can for example be delimited by means of a frame or a housing. The display fields of the separate display units may be arranged next to one another so as to be offset at right angles to the viewing direction and/or on top of one another and, if applicable, also at a distance from one another, wherein the display fields or display field or image sections, respectively, of the separate display units, which are visible from the observation point or device operating position, are preferably located outside of one another, in particular in such a way that a display field, which is visible from the device operating position or image section of a display unit, respectively, is located outside of the display field or image section, respectively, of the respective other display unit.

In the case of such separate display units, however, the illustrated image contents or the display surfaces, respectively, can often not be placed edge-to-edge without a gap, but a gap-shaped space remains between the displayable image contents or the display surfaces, respectively, so that the division into separate display units remains clearly visible to the observer and that a harmonious transition between the image contents, which is more pleasant for the visual perception, is not present between the image contents, which may also lead to symptoms of fatigue for the observer and for his eyes. Such a gap between the separate display units substantially results from the fact that the separate display units often have frames, which surround the actual display surface, on which image contents can be displayed, all around, so that the display surface does not reach all the way to the circumferential delimitation of the display unit. Due to the fact that the display units also have separate housings, the space required for the housing walls also results in a certain spacing of the display units or the display surfaces thereof, respectively.

In the case of gaming machines, it has already been proposed to arrange the display units so as to be staggered one behind the other, see, for example, WO 2009/033615, whereby the edge or border area, respectively, of the rear screen is covered and is no longer visible. However, the border area of the front screens remains as sight barrier or spacing, respectively, between the display surfaces.

In the case of television sets, it has already been proposed to make the actual display surface appear to be bigger, in that light sources are arranged on the borders of the screen, which radiate onto a wall located behind the screen and which illuminate this wall in color, so that the screen obtains a light enclosure in the manner of a halo. This circumferential illumination is in particular effective in the case of a wall mounting of flat screens, because the light sources can be hidden behind the screen borders, so that the observer cannot look directly into the light sources. To intensify the visual enlarging effect of such an illumination, the light color of the light emitted onto the wall is thereby adapted to the screen display, i.e. the predominant color in the border areas of the display surface of the screen, see WO 2008/142639 A1 and EP 1379082 B1. It is furthermore known from EP 1994801 to hereby not only consider the colors of predetermined image blocks, which are displayed on the display surface, but to also evaluate or weight them, respectively, differently, in order to be able to more strongly adapt the color of the ambient lighting to more important image blocks. In particular moving objects are identified for this purpose in the screen display, in order to be able to consider the color thereof differently for the ambient lighting.

Due to the fact that not only one color is routinely displayed in a certain image block of a screen, an average color can be formed from the plurality of the displayed colors or a color spectrum, which characterizes the image block, can be determined, as is shown, for example, in DE 10 2007 004 834 A1. The light spectra emitted by individual light sources of pixels, respectively, are thereby captured and are tuned individually in such a way that a resulting overall spectrum at least approximately corresponds to a desired light spectrum and thus to a desired color.

It is further known from WO 2007/113754 to illuminate the environment of a screen not only in a diffusely colored manner, but to thereby generate light patterns, which are adapted to the screen display.

SUMMARY OF THE INVENTION

The present invention is based on the object of creating an improved display device, an improved entertainment machine comprising such a display device, as well as an improved method of the above-mentioned type, which avoid disadvantages of the prior art, and to further develop the latter in an advantageous manner. In particular, a harmonious, visual transition, which is as smooth as possible, it to be obtained between separate display units, in order to make it possible to observe the separate display units, in a manner, which is pleasing and fatigue-free, for the eye.

According to the invention, the mentioned object is solved by means of a display device, an entertainment machine, as well as a method as disclosed herein and in accordance with the claims. Preferred embodiments of the invention are the subject matter of the dependent claims.

It is thus proposed to examine the display surfaces of the plurality of display units, in particular the border areas of the display surfaces bordering the transition area between these display units, with respect to the colors displayed there and to obtain color information therefrom. By means of this color information, the color of the emitted light of the illuminating device, by means of which the transition area between the at least two display units is illuminated, is controlled. By considering the display surfaces, in particular the border areas, of both or of all display units and of the image colors displayed there, the transition area between the two or all display units can be illuminated in color harmony with the bordering display surfaces. In addition to the at least two display units and the illuminating device, the display device according to the invention comprises at least one determining device for determining a first color information from an image block of a first one of the at least two display units and for determining a second color information from an image block of a second one of the at least two display units, and further a color control device for controlling the color and/or the color spectrum of the light emitted by the illuminating device as a function of the first and second color information. Such an image block of the first or second display unit can in particular be a partial area of the display surface of the respective display unit, which is defined with regard to the contour, preferably in the vicinity of the border of the display unit, which extends adjacent to a further bordering screen. An image block can preferably be an at least approximately rectangular area of the respective display unit in the vicinity of or bordering the outer border of the respective display unit, in which area an image and/or video signal can be displayed in particular in pixel blocks or points. In the simplest case, such an image block may encompass the entire display surface of the respective display unit.

The color control device automatically controls the illuminating device as a function of color information from both display units. A harmonious, smooth transition between the at least two display units can be reached through this, which optically mitigates the separation between the display units or which approximately eliminates the optical separation, respectively, so that the eye of an observer can wander back and forth between the display surfaces of the display units less erratically and thus in a more fatigue-free manner. The color information from the two display units is determined by at least one determining device. The at least one determining device and the color control device can be combined, for example functionally and/or physically, to form a control unit or control device. The at least one determining device and the color control device, however, can also be embodied as separate units.

In particular, the color of the light emitted by the illuminating device can be mixed from the predominant colors of the image blocks bordering the transition area of the at least two display units or from the color information obtained from the mentioned image blocks, respectively. A mixed color, which can be emitted by the illuminating device, can include color portions, which correspond to the color information from the image block of the above-mentioned first display unit, and can also include color portions, which correspond to the color information from the image block of the second display unit. The above-mentioned color control device can hereby be set up to mix the first and second color information to form a color signal, wherein the illuminating device is embodied to deliver a mixed color in accordance with the color signal or mixed color signal, respectively, generated by means of mixing.

In the alternative or in addition, the color control device can also determine more than only one color signal from the color information determined from the image blocks of the different display units, and can use the different color signals to control different light emitting elements of the illuminating device, in order to physically obtain a color mixture only on the plane of the light emitted by the light emitting elements. More specifically, a first color signal can be determined from the first color information and a second color signal can be determined from the second color information, wherein a first light emitting element of the illuminating device is controlled by means of the first color signal and a second light emitting element of the illuminating device can be controlled by means of the second color signal, so that individually colored light is in each case emitted by the first light emitting element and by the second light emitting element. Depending on the color information from the respective assigned display unit, the light emitting elements thereby in particular emit differently colored light, which then mixes into a mixed color light.

In order to obtain an optically as seamless as possible transition between the at least two separate display units by means of the light emitted by the illuminating device, the illuminating device can be arranged, in an advantageous further development of the invention, at least partially in the transition area between the at least two display units and can have a main emission direction, which is directed away from the display units onto the observer or an intended observation point, respectively, or which is emitted parallel to a main emission direction of the display units, respectively. In contrast to the known circumferential illuminations of screens, the illuminating device thus illuminates forward into an area in front of the front side of the display units, which the display units face with their display surfaces, and in which an observer stands or sits as intended. The illuminating device thus does not have the impression of a background illumination, but forms a foreground illumination.

The illuminating device can advantageously have an emission optics for generating a beam, which widens in emission direction, which beam advantageously covers edge areas, which face one another, of the at least two display units, towards a front side of the display units. The mentioned emission optics can for example comprise one or a plurality of suitable lenses, which capture the light emitted by at least one light source and emit it in the form of a focused bundle. The mentioned at least one lens can thereby provided in addition to the primary lens, which is common in the case of LEDs and which is located directly on the LED element. As an alternative or in addition to such a lens, the optical emission system can also comprise at least one reflector, which captures the light emitted by the at least one light source, and emits it to the front side of the display units in the form of the mentioned beam. The emission optics can for example furthermore also be embodied as so-called diffusor, by means of which the light emitted by the light source is scattered.

By covering the edge areas with the emitted light beam, the observer of the display units at least no longer predominantly sees the edge areas of the separate display units, but the emitted beam of the illuminating device, so that the light emitted by the illuminating device can create a harmonious transition between the display units. The light beam thus builds a light bridge, so to speak, between the display surfaces of adjacent display units and hereby covers the transition area between the display units.

The at least one light source of the illuminating device may hereby be arranged between the display units, in particular in a gap between the spaced-apart borders or edges thereof, respectively, whereby the emission optics (e.g. lens, lens comprising light guide, diffusor, etc.) may also be arranged between the display units, but may also be superimposed to the border areas of the display units. In the alternative, the light source itself can also be arranged in front of the border areas of the display units; it can in particular be located directly above a gap between the display units or can be superimposed to the transition area between the display units.

On principle, the illuminating device can thereby comprise different types of light sources, for example a rod-shaped fluorescent tube or a narrow, elongated light strip. In the alternative or in addition, the illuminating device may also comprise a plurality of, in particular, punctiform light sources, preferably in the form of LEDs or RGB emitters, which may be arranged next to one another in one or several rows and/or in a matrix-like arrangement.

As a whole, the arrangement of the light sources of the illuminating device and/or the contour of the illuminating device as a whole may be adapted to the transition area between the display units, wherein a strip-shaped contouring of the illuminating device can be provided in particular in the case of an elongated, gap-shaped transition area between the display units. For this purpose, provision can be made for example for one or a plurality of rows of LEDs. The mentioned LEDs or the punctiform light sources embodied in a different way, respectively, can for example be located directly on a printed circuit board for controlling the light sources.

Advantageously, the mentioned light sources may hereby be controlled individually or in subgroups by the control device, in particular in such a way that the light intensity of the light sources can be adjusted individually or in groups, respectively. By means of such a separate controllability of the light sources, the red light proportion may be increased for example, in that the light sources, which emit red, are powered up in their power output or in their light intensity, respectively. For example the blue-light proportion can be reduced accordingly, in that the blue light-emitting light sources are dimmed or in that their light intensity is brought down, respectively.

When using a plurality of light sources, a specific color distribution can also be provided to the emitted beam with respect to its coloring, for example to the effect that the emitted beam dos not evenly emit orange-colored light, when a transition between a yellowish image block on the first display unit to a reddish image block on the second display unit is to be created, but the beam to the display unit, the border-side image block of which includes yellowish light, can include more yellow light and can emit more red light towards the second display, the border-side image block of which includes more reddish light. Such a color distribution in the beam emitted by the illuminating device can be obtained for example by means of a suitable embodiment of the emission optics. Different emission directions or main emission directions, respectively, can be assigned to the different light sources, for example in such a way that an upper LED row radiates slightly upwards and a lower LED row radiates slightly downwards, in order to be able to assign a light color more to a lower display unit and to assign another light color more to an upper display unit. It goes without saying that further LED rows can also be provided hereby, which have overlapping main emission directions. In the alternative or in addition, the above-mentioned lower and upper rows—in the case of a different arrangement—or other light source groups may irradiate overlapping beam segments in spite of their different main emission directions, in order to obtain a mixing of the colors and a harmonious transition.

In further development of the invention, provision can be made for the illuminating device to be subdivided into a plurality of light emitting elements, which are lined up along the transition area between two adjacent display units and which may each be controlled separately. The light emitting elements may hereby in each case be assigned their own pair of image blocks. The first and second color information, as a function of which the respective light emitting element can be controlled by the color control device, may in each case be obtained individually from this pair of image blocks. The color or the color spectrum of a respective light emitting element is not controlled according to the average color or the color spectrum, respectively, of all of the border areas of the bordering display units, or, e.g., of the entire display surface of the display units, but only by means of the predominant color or color spectrum, respectively, of an image block pair, which is located directly in the vicinity of the respective light emitting element. In other words, a middle-central light emitting element for example only displays or reproduces, respectively, the colors of the middle-central image blocks, while image blocks on the right and left borders next to the middle-central lighting image blocks are not considered in response to the color control of the middle-central light emitting elements or are at least weighted less strongly.

To allow for a simple mounting of the display device, the mentioned at least two display units may form a pre-assemblable built-in module with the illuminating device, which, as such or as pre-assemblable unit, respectively, may be installed into a common device housing or may be attached to a common wall holder or a common floor stand. In particular, the two display units, together with the illuminating device, which is provided in the transition area between the two separate display units, may be pre-mounted to form a dimensionally stable assembly, which is then inserted into the device housing or mounted to the wall holder or floor stand, respectively.

The mentioned display units may hereby be embodied in different ways and may be positioned relative to one another in different ways. Advantageously, for example at least two display units may be inclined relative to one another at an obtuse angle, in particular in such a way that the display surfaces of the display units, which face a predetermined observer position, have an angle of less than 180° to one another.

The mentioned display units can thereby comprise display surfaces, which are embodied in a substantially flat manner. In the alternative, however, the display units may preferably also have uniaxially curved display surfaces.

In the case of a flat embodiment of the display surfaces, the display units may also be arranged parallel to one another or in a common plane, respectively. In the area of their bordering border areas, the display units may advantageously be arranged at the same distance from a predetermined observer position, i.e. approximately with the same depth in the device housing or on a holder, respectively.

The mentioned display units may thereby be embodies as screen units, in particular as flat screen, for example in the form of a TFT or LCD screen.

On principle, the open or closed-loop control of the color or of the color spectrum, respectively, of the emitted light of the illuminating device can thereby be embodied in various ways. According to an advantageous further development of the invention, the at least one determining device, which initially consecutively obtains the first color information from an image block of the first display unit and temporarily stores it, if applicable, and then obtains the second color information from an image block of the second display unit and temporarily stores it, if applicable, in turn, can be assigned to the image blocks of the plurality of display units together. The determination of the color information from the plurality of display units may hereby be repeated cyclically so as to alternate, or, in the case of more than two display units, can take place consecutively in turn or cyclically in series, respectively, so to speak.

As an alternative to such a common determining device, which is assigned to a plurality of display units, provision can also be made for a plurality of determining devices for determining the color information, which obtain or determine, respectively, the color information from the image blocks of the different display units in a temporally parallel and/or temporally overlapping or also in a temporally offset manner. The color information obtained from the plurality of determining devices can hereby be supplied to the color control device in a temporally parallel and/or temporally overlapping or also in a temporally offset manner, in order to generate the color signal for controlling the illuminating device from the color information.

In particular in the color control device, the color signal for controlling the illuminating device can in particular be mixed together from the first and second and, if applicable, further color information of the image blocks of the first and second and, if applicable, further display units to form the color signal or a mixed color signal, respectively. The color signal or the mixed color signal, respectively, can hereby for example be mixed together mathematically by observing at least one predetermined calculation rule. For example, color information, which is present as RGB information, may be added and averaged by color. In the case of two display units, in which an image block is analyzed in each case, for example a first red portion from the image block of the first display unit and a red light portion from the image block of the second display unit may be added together and may be divided by two, thus (R1+R2)/2, wherein the procedure is the same for the green light and blue light portions or information, respectively, thus (G1+G2)/2 and (B1+B2)/2, so that new RGB information may be determined from the averaged color parameters. In the alternative or in addition, light spectra may be captured and combined with one another, as is shown for example by DE 10 2007 004 834 A1, in order to obtain a desired resulting light spectrum.

The color signal mixed or averaged in this way, respectively, can then be used by the color control device to control the illuminating device or the light sources thereof, respectively. These light sources may then emit a corresponding light as a function of the obtained color signal.

In the alternative, the color signal for controlling the illuminating device in particular by means of the mixing functionality of the color control device may also be determined with the help of at least one color table. A matching mixed color, which is then used for the color signal or mixed color signal, respectively, to control the illuminating device, may then be deduced from the color table, for example by means of the color information of the image blocks of the first and second and, if applicable, further display units.

In the alternative or in addition to a mixing of the determined color information of the separate display units in terms of control or mathematically, respectively, to form a mixed color signal or a deduction of the mixed color signal with the help of at least one color table, which is then used for controlling all or some light sources, the mixing of the color information may physically also first take place at the stage of the light sources or of the light emitted thereby, respectively. As a further development of the invention, the first color information determined for a first display unit may be converted and used by the color control device into a color signal or signal for triggering a first light source or a first subgroup of light sources. The mentioned color control device may convert the second color information from the second display unit into a second color signal or color control signal, respectively, by means of which a further light source or a further subgroup of light sources is controlled. The color control device accordingly controls different light sources or different subgroups of light sources, respectively, with different color signals, which color signals in each case correspond to different color information. The mixing then takes place by mixing the light emitted by the different light sources or different subgroups of light sources, respectively. If the color information yellow, for example, is obtained from the first display unit, a first subgroup of light sources is controlled, in order to emit yellow light. If red is determined as color information for the second display unit, a second subgroup of light sources with a red color signal is controlled, in order to emit reddish light. The emitted yellow and the emitted reddish light then mix into orange light. By means of such a physical light mixture, computing capacity or power, respectively, may be saved and, if applicable, the above-mentioned mixing functionality in the color control device may be completely dispensed with, so that a quick conversion of an illumination, which is adapted to the image display of the different display units, may be obtained by means of simple control systems.

For transmitting the respective color information of the respective image blocks of the at least two display units to the at least one determining device, provision can ideally be made for an optical waveguide. For example a light or light spectrum, respectively, emitted by the respective image block, may be coupled into this optical waveguide, and may be transmitted to the determining device, e.g. with as little scattering losses as possible. The transmitted light or light spectrum, respectively, may then be converted accordingly in the determining device, for example into color information and may then be evaluated accordingly. A respective color information of the respective image block, for example, may thus be determined systematically ideally with influencing other, e.g. adjacent image blocks, as little as possible.

CARRYING OUT THE INVENTION

The invention will be explained in more detail below by means of preferred exemplary embodiments and corresponding drawings. In the drawings:

FIG. 2: shows a side view of the display device from FIG. 1 in different embodiment alternatives, wherein FIG. 2a shows a display device comprising two display units, which are arranged at an obtuse angle to one another, which are combined to form a pre-mounted assembly in the form of a built-in module, which is ready to be installed, with the illuminating device arranged in the transition area and the corresponding determining device, such as corresponding color control device, to control the illuminating device, wherein FIG. 2b shows a display device comprising two separate display units, which are arranged in a common plane, and wherein

FIG. 3: shows a sectional view of the illuminating device and the arrangement thereof in the transition area between two separate display units in different embodiment alternatives, wherein

FIG. 4: shows a schematic and exemplary illustration of the course of the method for operating the display device in different embodiment alternatives, wherein FIG. 4a shows an embodiment, in the case of which a common determining device for determining the color information from image blocks of the different display units is assigned to two separate display units, and a determination of the color information takes place sequentially, wherein FIG. 4b shows an embodiment, in the case of which the two display units in each case use separate determining devices for determining the color information from a respective image block of the respective display unit, and a determination of the color information takes place in a temporally parallel or at least temporally overlapping manner, and wherein

Figure 1:
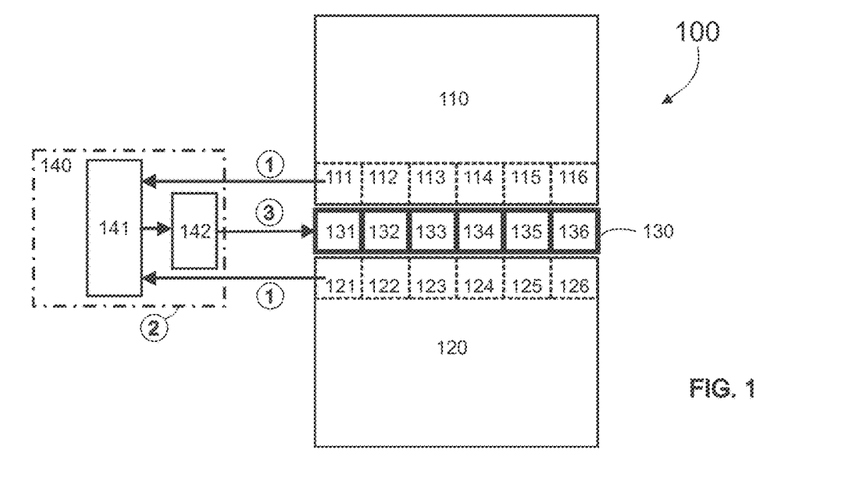
FIG. 1: shows a schematic top view onto a display device according to an advantageous embodiment of the invention, wherein provision is made for two separate display units, which are arranged on top of one another, in the form of screens, between which provision is made for an illuminating device, which is composed of a plurality of lighting components, as well as an exemplary course of the method for operating the display device.

As shown in FIG. 1, the display device 100 may comprise two separate, independent functional display units 110 and 120, which can be embodied as screens, for example in the form of flat screens, such as LCD screens or TFT screens. The two display units 110 and 120 are arranged adjacent to one another, so that the border-side edges of the display units 110 and 120 extend parallel to one another or back-to-back, respectively, and delimit a strip-shaped gap between one another.

The illuminating device 130, which, as a whole, is embodied in a strip-shaped manner or which can be adapted to the transition area between the display units 110 and 120, respectively, is arranged in this gap between the border-side edges or in the transition area between the two display units 110 and 120, respectively. In particular, the illuminating device 130 can at least partially be positioned between the border-side edges of the display units 110 and 120.

As is shown in FIG. 1, the illuminating device 130 can comprise a plurality of light emitting elements 131, 132, 133, 134, 135 and 136, which, together, form the illuminating device 130 and which can be arranged next to one another or in a row behind one another, respectively. The mentioned light emitting elements 131 to 136 can in each case comprise at least one light source, for example in the form of an LED or a RGB unit, i.e. a red-green-blue light unit. In further development of the invention however, each of the light emitting elements 131 to 136 can comprise a plurality of punctiform light sources, which can be arranged in one or in a plurality of rows in a matrix-shaped arrangement on a printed circuit board or in another suitable manner.

The display device 100, which is illustrated in an exemplary and schematic manner in FIG. 1, furthermore comprises at least one determining device 141. A first color information from an image block of the first display unit 110 as well as a second color information from an image block of the second display unit 120 can be determined with the help of the determining device 141. The display device 100 furthermore has a color control device 142, by means of which a color and/or a color spectrum of the light emitted by the illuminating device 130 or by the individual light emitting elements 131 to 136, respectively, can be scattered as a function of the first and second color information. The at least one determining device 141 and the color control device 142 can for example be functionally combined to form a control unit 140 or can be embodied as separate functional units.

As shown in FIG. 2, the display units 110, 120 can be positioned differently to one another and can even be contoured differently. As is shown in FIG. 2a, two display units 210 and 220, which are embodied so as to be flat, can be arranged at an obtuse angle to one another, so that the front sides of the display units 210 and 220, which face an observation point 201, draw an angle of less than 180° to one another. For example, an upper display unit 210 can be arranged substantially vertically, while a lower display unit 220 can be arranged at an incline to the vertical, in particular a lower border section can be tilted out forwards towards the observer spot 201. In such an obtuse-angled arrangement, the illuminating device 230 can be arranged in the area of the bending axis between the two display units 210 and 220, see FIG. 2a.

Figure 5:
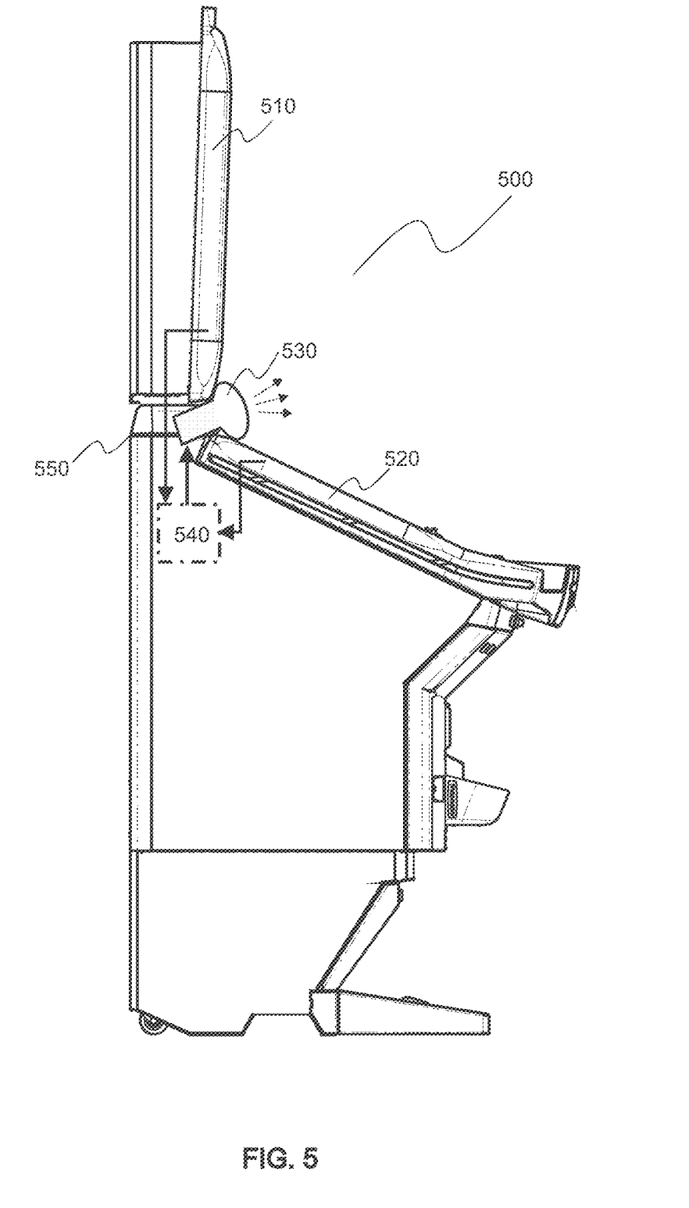
FIG. 5: shows a schematic, partially cut side view of an entertainment machine, which has two display units, which are arranged so as to be inclined at an obtuse angle to one another, in the form of flat screens, between which provision is made for an illuminating device of the type as shown in the preceding figures.

Such an obtuse-angled arrangement of the display units can in particular be advantageous in order to integrate or install the display device 100 into a device housing 550 of an entertainment machine 500, as is shown in FIG. 5. In said FIG. 5, the two display units are identified with 510 and 520, while the illuminating device is identified with 530.

Figure 2A:
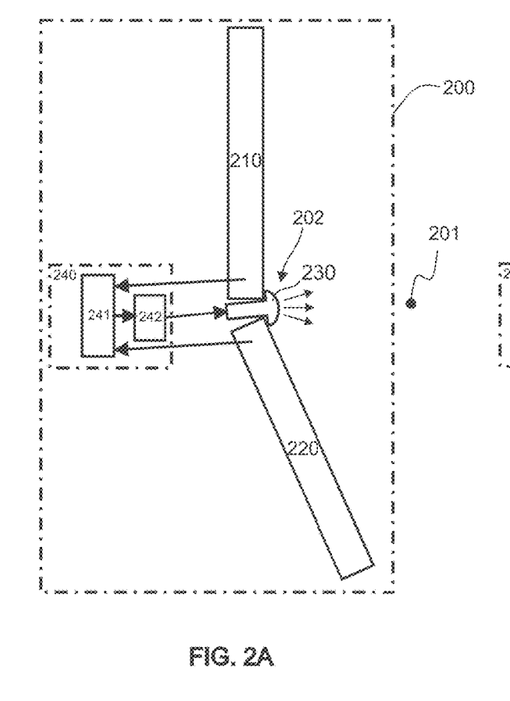

To facilitate the mounting of the display device 100, the two display units 210 and 220 or 510 and 520, respectively, can be combined together with the illuminating device 230 or 530, respectively, to form a pre-assembled built-in module 200, see FIG. 2a, which forms a dimensionally stable assembly, which can be handled as unit. The determining device 241 and the color control device 242 can furthermore be part of the mentioned pre-assembled built-in module 200—either as separate functional units (as illustrated in FIG. 2a in an exemplary manner) or combined in a control unit 240 or 540, respectively (as illustrated in FIG. 5 in an exemplary manner).

Figure 2B:
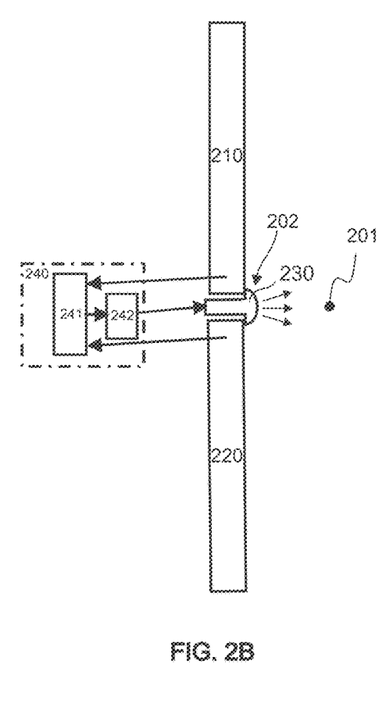

As is shown in FIG. 2b, two flat display units 210 and 220 can also be arranged in a common plane, wherein the illuminating device 230 can also be arranged in the transition area 202 between the display units 210 and 220 here. It goes without saying, however, that such a non-angled arrangement of the display units 210 and 220, together with the illuminating device 230, the determining device 241 and the color control device 242 can be combined to form a pre-mounted assembly 200, wherein the determining device 241 and the color control device 241 can also be functionally combined to form a control unit 240.

Figure 2C:
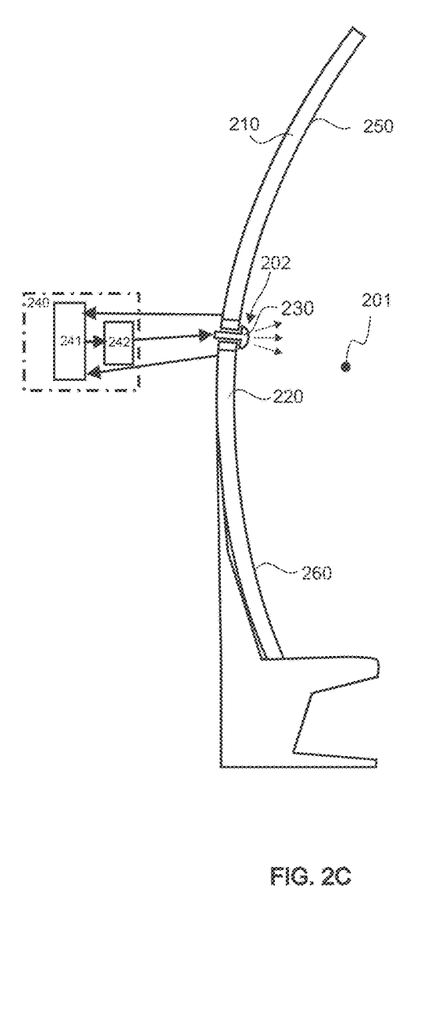
FIG. 2c shows a display device comprising two separate display units, which have uniaxially curved display surfaces.
Figure 2D:
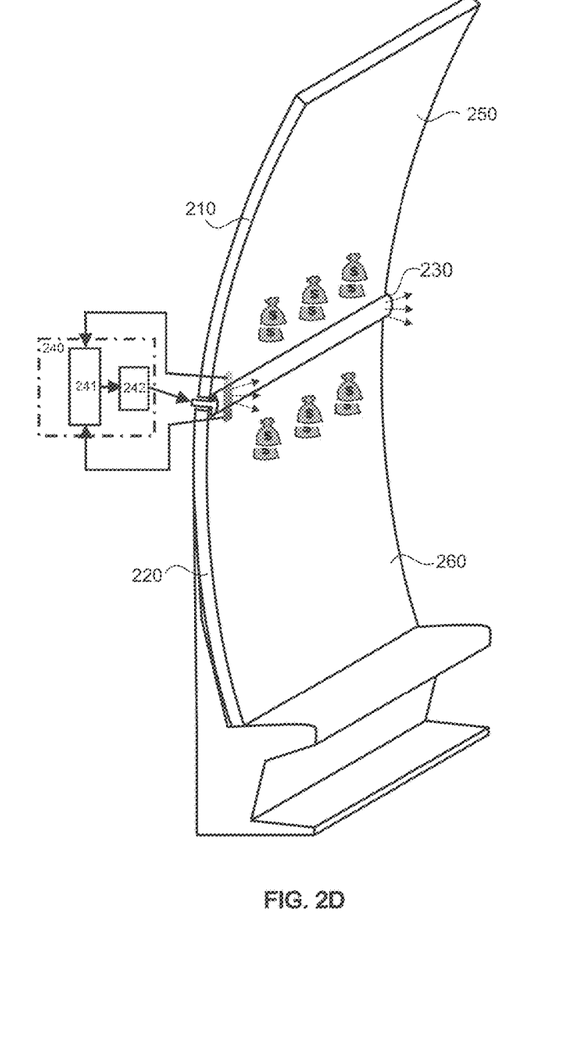

As shown in FIG. 2c or FIG. 2d, respectively, the display units 210 and 220 can also have a non-flat embodiment, in particular a curved contouring. The display units 210 and 220 can thereby in particular have a uniaxially curved display surface 250 and 260, which can be curved concavely towards the observation point 201, but which, if applicable, can also have a convex contouring. As shown in FIG. 2c and FIG. 2d, the two display units 210 and 220 can be arranged relative to one another in such a way that the curved display surfaces 250 and 260 are arranged relative to one another in such a way that the curved display surfaces 250 and 260 continue one another harmoniously or border one another in a steady, continuous manner, respectively, wherein, viewed together in cross-section, the display surfaces 250 and 260 can have a partially circular or partially elliptical or partially oval contouring, see FIG. 2c and FIG. 2d.

The illuminating device 230 can be provided in the transition area 202 between the two display units 210 and 220, and can be controlled by the color control device 242, wherein a combination to a pre-assembled built-in group 200 can also be provided here. For a determination of the color information, provision is made, in turn, for at least one determining device 241, which can be combined for example with the color control device 242 to form a control unit 240.

Figure 3A:
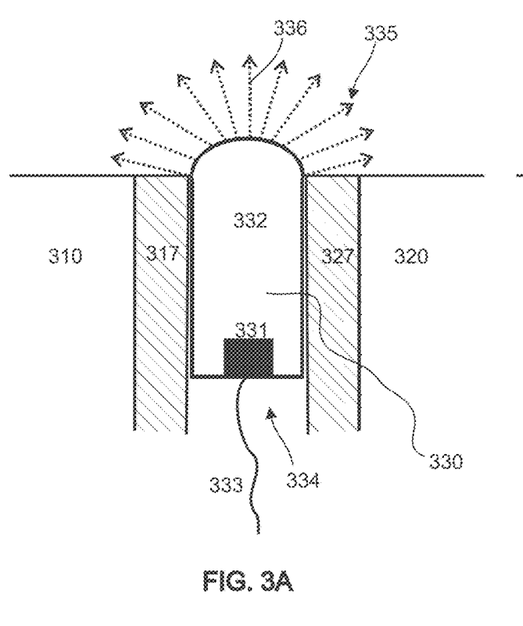
FIG. 3a shows an embodiment, in the case of which the at least one light source of the illuminating device is arranged in a gap between the border or edge sections, respectively, of two separate display units, and an emission optics protrudes from the gap in order to emit a beam, which widens.

As shown in FIG. 3, the illuminating device can be provided in different ways in the transition area 202 between the display units 310, 320. As shown in FIG. 3a, at least a part of the illuminating device 330 can be arranged for example in the above-mentioned gap 334 between the border-side edges of the display units 310 and 320, wherein the mentioned border-side edges can be formed by frame parts 317 and 327 of the mentioned display units 310 and 320. The mentioned frame parts 317 and 327 can for example circumferentially enclose the screen area of the display units 310 and 320.

The light emitting element 331 shown in FIG. 3a can for example correspond to one of the light emitting elements 131 to 136 shown in FIG. 1 and can comprise one or a plurality of light sources. An emission optics 332, which captures the light emitted by the at least one light source of the light emitting element 331 and forms it into a bundle 335, can also at least partially be arranged between the display units 310 and 320, wherein the mentioned emission optics 332 can for example have a lens and/or a light guide or, e.g., can be embodied as diffusor. The beam 335 emitted by an emitting surface of the emission optics 332 advantageously has a main emission direction 336, which is directed away from the front side of the display units 310 and 320 onto the mentioned observation point 201 or which runs parallel to a main emission direction of the display units 310 and 320, respectively. The beam 335 thereby widens to the extent that, viewed from the observation point 201, the beam 335 covers the border-side edges of the display units 310 an 320, for example in the form of the frame parts 317 and 327.

Figure 3B:
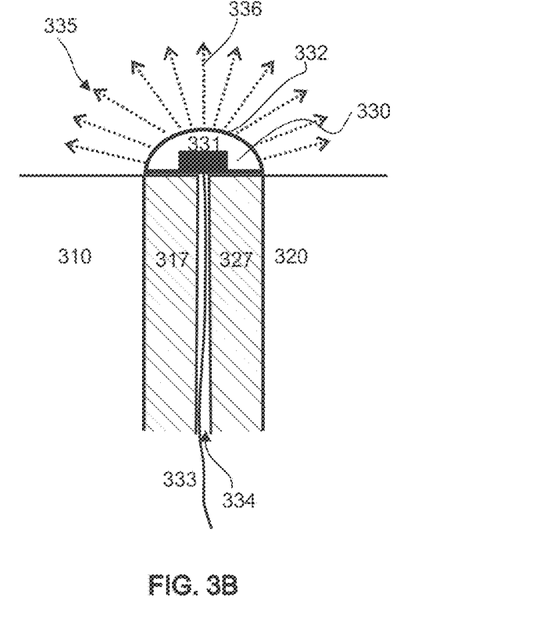
FIG. 3b shows an embodiment, in the case of which the at least one light source is arranged on the front side of two adjacent display units, and covers the gap or transition area, respectively, between the two display units, and the emission optics is also arranged so as to cover the border areas of the display units.

As shown in FIG. 3b, the illuminating device 330 including the mentioned light emitting element 331 can also be superimposed to the transition area or the gap 334, respectively, between the display units 310 and 320, or can be arranged on the front side of the mentioned display units 310 and 320, respectively. In this case, only the connection 333 for the color control device for controlling the illuminating device 330 can substantially be guided through the transition area between the display units 310 and 320 of the rear side to the mentioned display units 310 and 320, see FIG. 3b.

Figure 3C:
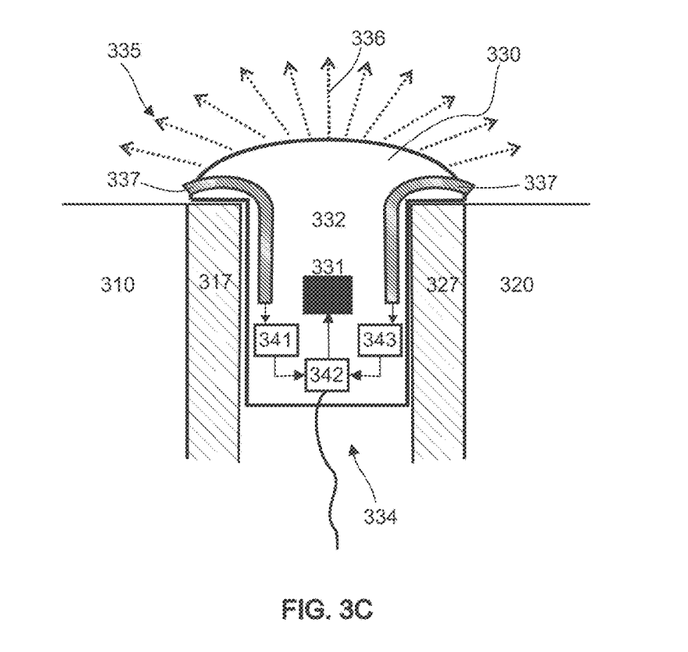
FIG. 3c shows an embodiment, in the case of which the at least one light source is arranged in a gap between the edge sections, and the emission optics is arranged so as to at least partially cover the border areas of the display units.

The illuminating device 330, which comprises the light emitting element 331 (e.g. LED, RGB unit, etc.), is furthermore illustrated in an exemplary manner in FIG. 3c. The illuminating device 330 is thereby at least partially arranged in the transition area or the gap 334, respectively, between the display units 310 and 320, wherein the emission optics 332, which catches the light emitted by the at least one light source of the light emitting element 331, and forms it into a beam 335, is at least partially arranged between the display units 310 and 320 and which is at least partially superimposed to the transition area 334 between the display units 310 and 320, respectively, or on the border-side edges, respectively, of frame parts 317 and 327 of the mentioned display units 310 and 320. As shown in FIG. 3c, the illuminating device 330 furthermore comprises at least two optical waveguides 337, one of which catches the color information output by the respective image blocks 111 to 116 and 121 to 126 of the display units 310 and 320 and is transmitted to at least one determining device 342, 343. The optical waveguides 337 are for example embodied in such a way that they can in a targeted manner transmit a color information of the respective image block 111 to 116 or 121 to 126, respectively, to which the respective optical waveguide 337 is assigned. The color information (e.g. light or light spectrum, respectively, emitted by the respective image block 111 to 116 or 121 to 126, respectively) can be converted accordingly and evaluated in the determining device 341, 343. The determined color information is then transmitted to a color control device 342 and is used for a control of the light emitting element 331—see FIG. 3c.

Figure 6:
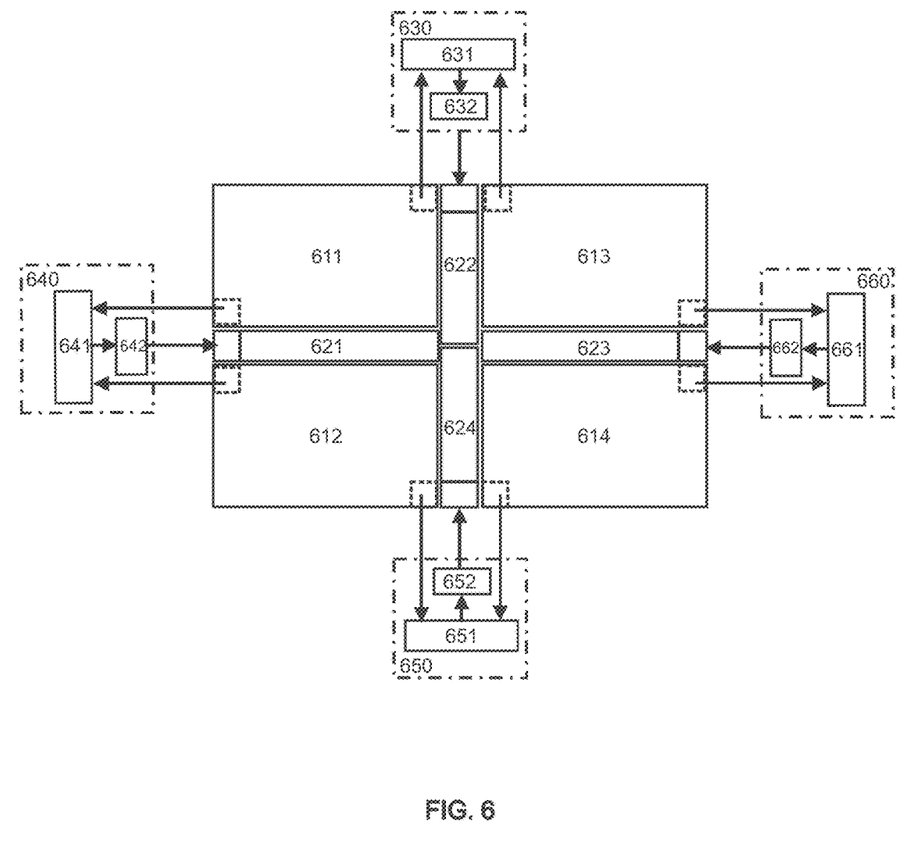
FIG. 6: shows a top view onto a display device comprising four separate display units, which are arranged on top of and next to one another, in order to result in an overall rectangular arrangement when put together, wherein light emitting elements of the illuminating device, which also protrude into the square space between the four display units in the core of the arrangement, are arranged in each case in the gaps-shaped spaces between the screens.

As is shown in FIG. 6, the display device 100 can also comprise more than two display units, for example the fourth display units 611, 612, 613 and 614 illustrated in FIG. 6, which can be positioned on top of one another and next to one another in pairs, so that the display device 100 as a whole has a rectangular contouring.

A substantially cross-shaped gap, in which illuminating devices 621, 622, 623 and 624 can be provided, in turn, in order to harmonize the transitions of the image illustrations on the display units 611 to 614, remains between the four display units 611 to 614. The mentioned illuminating devices 621 to 624 can thereby in each case be embodied in a bar-shaped or strip-shaped manner, respectively, or can be adapted to the transition area, respectively, or the gap, respectively, between the display units 611 and 614. The mentioned illuminating devices 621 to 624 can hereby also fill or cover, respectively, the central area of the cross-shaped gap, wherein two illuminating devices 622 and 624 can protrude into the central area edge-to-edge here. In the alternative, it would also be possible for all four illuminating devices 621 to 624 to fill this central area, for example by means of triangular end contours.

As shown in FIG. 6, provision can in each case be made for at least one determining device 631, 641, 651 and 661 for the illuminating devices 621 to 624 for determining the respective color information as well as for a color control device 632, 642, 652 and 662 for controlling the color of the color spectrum, respectively, of the respective illuminating devices 621 to 624, respectively. These determining devices 631, 641, 651 and 661 or the color control devices 632, 642, 652 and 662, respectively, can in turn be embodied as separate functional units and can be assigned to the respective illuminating devices 621 to 624 or, as illustrated in FIG. 6, can be combined to form control units 630, 640, 650 and 660. An illuminating device 621 to 624 can then for example in each case be controlled by the respective assigned control unit 630, 640, 650, 660, which in each case communicates with the corresponding display units 611 to 614, to which the respective illuminating device 621 to 624 is assigned or between the transition area of which the respective illuminating device 621 to 624 extends, respectively.

Returning to FIG. 1, the mentioned color control device 142, which, e.g. together with the at least one determining device 141, can form a control unit 140, can control each of the light emitting elements 131 to 136 of the illuminating device 130 individually, i.e. separately and independently from the other lighting components, wherein, if applicable, a control in groups can also be provided. The color and/or the color spectrum of the light, which is emitted by the respective light emitting element 131 to 136, is thereby determined by means of the proposed method for operating the display device 100. The color control device 142 thereby considers color information, of which the colors of the image displays on the display units 110 and 120 are considered.

More specifically, color information, which is determined from image blocks 111 and 121, is considered for controlling a respective light emitting element 131. These image blocks 111 and 121 extend on the border areas of the display surfaces of the display units 110 and 120 and border the respective light emitting element 131, see FIG. 1. Separate or individual image blocks, respectively, on the adjacent border of the display units 110 and 120 can hereby be assigned to each light emitting element 131 to 136, wherein the subdivision of the border areas of the display units 110 and 120 bordering the illuminating device 130 into individual image blocks 111 to 116 as well as 121 to 126 can correspond to the subdivision of the illuminating device 130 into individual light emitting elements 131 to 136, as it is shown in FIG. 1. In the alternative, the image blocks 111 to 116 as well as 121 to 126, however, could also have another classification structure, for example could be slightly spaced apart from one another or could slightly overlap one another in pairs. Only a common image block could furthermore also in each case be assigned for example to two light emitting elements 131 to 136, such as, e.g. the light emitting elements 132 and 133, at each display unit 110 and 120. If applicable, only a single image block could also be provided here along every border of the display surfaces of every display unit 110 and 120 bordering to the illuminating device 130, or, e.g., the entire display surface of each display unit 110 and 120 could form the image block, which is to be evaluated. The subdivision shown in FIG. 1, however, allows for a better color adaptation of the light of the illuminating device 130 to the colors of the image displays of the display units 110 and 120 at the borders bordering the illuminating device 130.

In a first method step 1—e.g. as illustrated in FIG. 1—a first color information is determined from a respective image block 111 of a first one of the at least two display units 110 and 120 bordering the transition area, and a second color information is determined from a respective image block 121 of a second one of the at least two display units 110 and 120 bordering the transition area by means of the mentioned at least one determining device 141 for a corresponding control of an exemplary light emitting element 131 of the illuminating device 130. For determining the color information, a color information (e.g. emitted light/light spectrum) emitted by the respective image block 111 or 121, respectively, of the respective display unit 110 or 120, respectively, can be captured by means of optical waveguides 337 or can be coupled into the latter, respectively, and can be transmitted to the at least one determining device 141. In a second method step 2, at least one color signal is then formed as a function of the mentioned first and second color information determined by the determining device 141. The mentioned color control device 142 then uses this at least one color signal in a third method step 3, in order to control the light emitting element 131 or the illuminating device 130, respectively, as a function of this at least one color signal. As a function of the determined color information, a light, the color and/or color spectrum of which is determined by the at least one color signal, is then emitted by the light emitting element 131 or by the illuminating device 130, respectively.

Figure 4A:
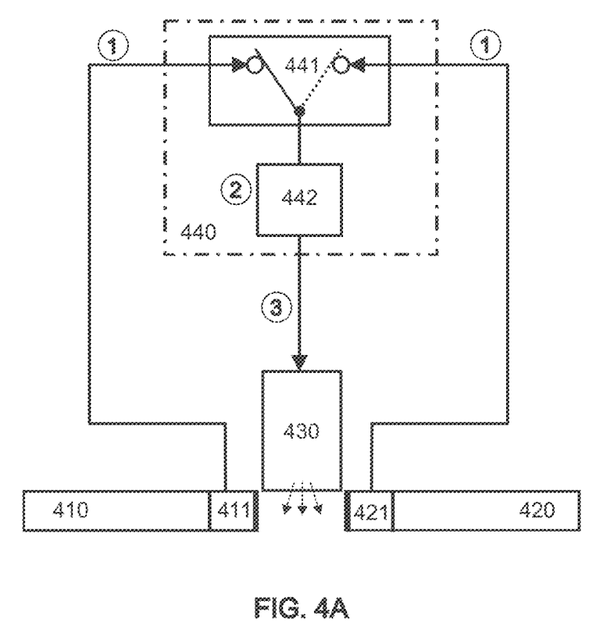

As shown in FIG. 4, the proposed method can be carried out in different ways. According to FIG. 4a, for example, the at least one determining device 441 can be used to determine the color information for a pair or a plurality of image blocks 411 and 421 of the two separate display units 410 and 420. In the first method step 1, the color information signals, which originate from the different image blocks 411, 412 and which can be coupled into optical waveguides 337, e.g. and can be transmitted by the latter to the determining unit 441, are transmitted to the determining unit 441 one after the other. This can be obtained for example by means of a switching function in the determining unit 441. By means of this switching function, a first color information of an image block 411 of the first display unit 410 can be determined first, for example, and can be temporarily stored, if applicable. A second color information, e.g., of an image block 412 of the second display unit 420 can then be determined and temporarily stored, if applicable.

The determining unit 441 then transfers these two pieces of determined color information to the color control device 442 in the second method step. From the two pieces of color information, a color signal or mixed color signal, respectively, is then derived or mixed together, respectively. This mixed color signal can for example be derived by means of a calculation rule (e.g. as arithmetic means, etc.) or with the help of at least one color table from the determined color information, for example in the manner as already described. In the third method step 3, the color signal is then used by the color control device 442 to control the illuminating device 430, which then converts the mixed color signal into a light, the coloring of which corresponds to this color or mixed color signal, respectively.

Figure 4B:
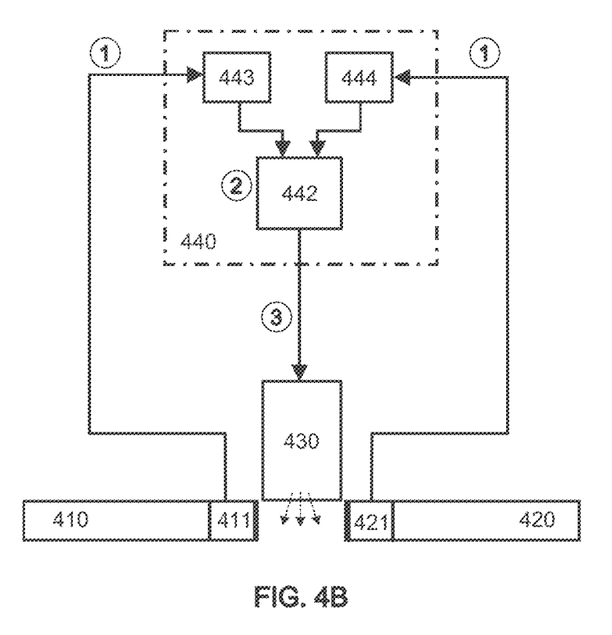

FIG. 4b shows a further exemplary course of the proposed method, in the case of which the color information from the image blocks 411 and 421 of the display units 410 and 420 can be determined in a temporally parallel or approximately temporally parallel manner, respectively. For this purpose, provision is made for separate determining units 443 and 444, which are assigned for example—as illustrated in FIG. 4b—to the separate display units 410 and 420 as respective independent determining units 443 and 444. In the first method step 1, a first determining unit 443, for example, which is assigned to the first display unit 410, determines a first color information of an image block 411 of the first display unit 410. Temporally parallel thereto, a second determining unit 444, which is assigned to the second display unit 420, determines a second color information of an image block 412 of the second display unit 420. A transmission of the color information signals to the determining units 443, 444 can thereby take place by means of optical waveguides 337, for example.

The color information determined by the determining units 443 and 444 is then in turn transmitted to the color control device 442 in the second method step 2, which, in turn, can take place in a temporally parallel manner, if applicable. Analogous to the alternative of FIG. 4a, the color control device then forms the color signal or mixed color signal, respectively e.g. by means of calculation rule or by means of at least one color table. In the third method step 3, the color control device 442 transmits this mixed color signal to the illuminating device 430 for the corresponding control and is converted accordingly by the illuminating device 430.

Figure 4C:
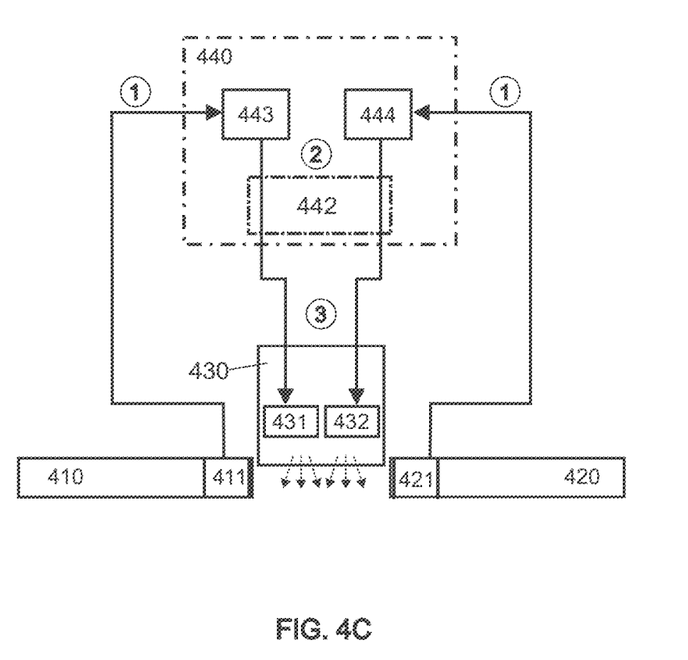
FIG. 4c shows an embodiment, in the case of which a determining device for determining the color information is assigned to each display unit, and the color signals or color control signals, respectively, obtained from the color information are used separately without prior mathematical mixing or mixing in terms of control, for controlling different light sources of subgroups of light sources of the illuminating device, to obtain a mixture at the stage of the emitted light.

FIG. 4c shows a further alternative of the course of the method for operating the display device 100 in an exemplary and schematic manner. A mixing process is hereby physically carried out on the level of the illuminating device 430. For this purpose, the corresponding color information is first determined in the first method step 1 by the determining units 443 and 444 from the image blocks 411 and 421 assigned thereto of the respective display units 410 and 420. This color information is then converted into corresponding color signals in the second method step 2. In the third method step 3, the color control device 442 then transmits these color signals to separate subgroups or separate light emitting elements 431 and 432, respectively, of the illuminating device 430, so that the color signal, which was obtained, e.g., from the color information of the image block 411 of the first display unit 410, is converted by the one light emitting element 431, while the other light emitting element 432 converts the color signal, which was determined from the color information of the image block 421 of the second display unit 420.

The invention claimed is:

1. A display device comprising;
    at least two display units;
    an illuminating device configured to illuminate a transition area between the at least two display units;
    a plurality of determining units including a first determining unit and a second determining unit, wherein the first determining unit is configured to determine a first color information from an image block of a first one of the at least two display units, and the second determining unit is configured to determine a second color information from an image block of a second one of the at least two display units;
    a color control device configured to control the color and/or the color spectrum of the light emitted by the illuminating device as a function of the first and second color information; and
    wherein the image block of the first one of the at least two display units is assigned to the first determining unit, and the image block of the second one of the at least two display units is assigned to the second determining unit, and the first color information and the second color information can be determined in a temporally parallel manner by the plurality of determining units.

2. The display device of claim 1, wherein the illuminating device is at least partially arranged in the transition area between the at least two display units and has a main emission direction which is directed away from display surfaces of the display units onto an intended observation point in front of the display surfaces.

3. The display device of claim 1, wherein the illuminating device has an emission optics configured to generate a beam which widens in an emission direction, wherein the beam at least partially covers edge areas, which face one another, of the at least two display units, towards a front side of the display units.

4. The display device of claim 1, wherein the at least two display units form a pre-assembled built-in module with the illuminating device, which can be installed into a common device housing as a pre-mounted unit.

5. The display device of claim 1, wherein the at least two display units are inclined at an obtuse angle to one another.

6. The display device of claim 1, wherein at least one of the display units has a uniaxially curved display surface.

7. The display device of claim 1, wherein the illuminating device is contoured in a strip-shaped manner.

8. The display device of claim 1, wherein the illuminating device has a plurality of punctiform light sources.

9. The display device of claim 8, wherein the light sources can be separately controlled individually by the color control device in such a way that the light intensity and/or light color of the light sources can be adjusted individually.

10. The display device of claim 1, wherein the illuminating device is subdivided into a plurality of light emitting elements, which are lined up along the transition area between two adjacent display units, wherein the light emitting elements can in each case be controlled separately by the color control device.

11. The display device of claim 10, wherein each of the light emitting elements is assigned its own pair of image blocks, wherein the first and second color information can be obtained from the assigned pair of image blocks, as a function of which the respective light emitting element can be controlled by the color control device.

12. The display device of claim 1, further comprising at least one optical waveguide configured to transmit the first and second color information to the at least one determining device.

13. The display device of claim 1, wherein the color control device is configured for mixing the first and second color information into a mixed color signal and the illuminating device is configured to output a mixed color in accordance with the mixed color signal.

14. The display device of claim 1, wherein a plurality of image blocks are assigned to the plurality of determining units to determine the first and second color information, wherein the plurality of determining units are configured to evaluate the plurality of image blocks one after the other.

15. The display device of claim 1, wherein the illuminating device comprises a first light emitting element, which can be controlled by a first color signal, which was determined as a function of the first color information, and comprises a second light emitting element, which can be controlled by a second color signal, which was determined as a function of the second color information.

16. The display device of claim 1, wherein the display device is attached to an entertainment machine.

17. A method of operating a display device, wherein the display device comprises at least two display units, and an illuminating device for illuminating a transition area between the at least two display units, the method comprising:

determining (i) by a first determining unit of a plurality of determining units, a first color information from at least one an image block of a first one of the at least two display units and (ii), by a second determining unit of the plurality of determining units, a second color information from at least one image block of a second one of the at least two display units, wherein the image block of the first one of the at least two display units is assigned to the first determining unit, and the image block of the second one of the at least two display units is assigned to the second determining unit, and the first color information and the second color information can be determined in a temporally parallel manner by the plurality of determining units;

forming, as a function of the first and second color information, at least one color signal; and controlling, by a color control device based on the at least one color signal, the illuminating device.

18. The method of claim 17, wherein the color signal is mixed from the first and second color information and is used as a mixed color signal for controlling a plurality of lighting components of the illuminating device.

19. The method of claim 17, wherein the at least one color signal is determined by use of a color table.

20. The method of claim 17, wherein the at least one color signal is calculated by the color control device based on a calculation rule from the first and second color information.

21. The method of claim 17, wherein the first and the second color information is converted into a first color signal and into a second color signal, wherein a first light emitting element of the illuminating device is controlled by the first color signal and a second light emitting element of the illuminating device is controlled by the second color signal, so that the first light emitting element and the second light emitting element in each case emit individually colored light.

22. The method of claim 17, wherein the respective color information of the respective image blocks of the at least two display units is transmitted to the plurality of determining units by use of optical waveguides.

* * * * *